United States Patent
Matsui (10) Patent No.: US 8,305,048 B2
(45) Date of Patent: Nov. 6, 2012

(54) VEHICLE POWER GENERATING DEVICE AND AN ALTERNATOR CONTROL METHOD

(75) Inventor: Hidehiko Matsui, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 454 days.

(21) Appl. No.: 12/562,740

(22) Filed: Sep. 18, 2009

(65) Prior Publication Data

US 2010/0079118 A1    Apr. 1, 2010

(30) Foreign Application Priority Data

Sep. 30, 2008   (JP) ................................. 2008-254978

(51) Int. Cl.
 H02P 11/00   (2006.01)
 H02P 9/00    (2006.01)
 H02H 7/06    (2006.01)
(52) U.S. Cl. ............... 322/34; 322/25; 322/28
(58) Field of Classification Search .................. 322/25, 322/28, 34
 See application file for complete search history.

(56) References Cited

U.S. PATENT DOCUMENTS

| | | | | |
|---|---|---|---|---|
| 4,308,492 A * | 12/1981 | Mori et al. | ...... | 322/28 |
| 4,500,772 A * | 2/1985 | Ahner et al. | ...... | 219/209 |
| 4,532,468 A * | 7/1985 | Nishida et al. | ...... | 323/367 |
| 4,593,241 A * | 6/1986 | Eulenberg et al. | ...... | 323/294 |
| 4,945,299 A * | 7/1990 | Watanabe | ...... | 322/33 |
| 5,353,044 A * | 10/1994 | Nakano et al. | ...... | 347/211 |
| 6,184,661 B1 * | 2/2001 | Becker et al. | ...... | 322/25 |
| 6,414,832 B1 | 7/2002 | Crecelius et al. | ...... | 361/120 |
| 7,009,904 B2 * | 3/2006 | Kim | ...... | 365/211 |
| 7,106,029 B2 | 9/2006 | Inokuchi et al. | ...... | 322/28 |
| 7,199,559 B2 * | 4/2007 | Yanagi | ...... | 322/33 |
| 7,266,031 B2 * | 9/2007 | Kim et al. | ...... | 365/211 |
| 7,602,152 B2 | 10/2009 | Oshima et al. | ...... | 322/33 |
| 7,952,471 B2 * | 5/2011 | Kizawa et al. | ...... | 340/438 |

(Continued)

FOREIGN PATENT DOCUMENTS

JP          08009567 A        1/1996

(Continued)

OTHER PUBLICATIONS

Japanese Office Action issued Nov. 29, 2011 in corresponding Japanese Patent Application No. 2008-254978 and English translation thereof.

*Primary Examiner* — Pedro J Cuevas
(74) *Attorney, Agent, or Firm* — Gifford, Krass, Sprinkle, Anderson & Citkowski, P.C.

(57) ABSTRACT

A vehicle power generating device includes an alternator which has a voltage regulator that keeps the voltage of generated power constant, and an electronic control unit that controls the voltage regulator. In this vehicle power generating device, the alternator has an abnormally high temperature determining portion that determines whether the temperature of the alternator is abnormally high, and an abnormal signal outputting portion which, when it has been determined by the abnormally high temperature determining portion that the temperature of the alternator is abnormally high, outputs a signal indicative of the determination that the temperature is abnormally high to the electronic control unit. Also, when the electronic control unit receives the signal indicative of the determination that the temperature is abnormally high, the electronic control unit controls the voltage regulator such that the voltage generated by the alternator is suppressed.

9 Claims, 4 Drawing Sheets

U.S. PATENT DOCUMENTS

| | | | |
|---|---|---|---|
| 8,040,112 B2 * | 10/2011 | Kikuchi et al. | 322/34 |
| 8,134,414 B2 * | 3/2012 | McCorquodale et al. | 331/36 R |
| 8,193,782 B2 * | 6/2012 | Mori et al. | 322/33 |
| 2001/0035688 A1 * | 11/2001 | Sawada et al. | 310/68 C |
| 2002/0149347 A1 * | 10/2002 | Asada | 322/28 |
| 2004/0239295 A1 | 12/2004 | Sumimoto et al. | 322/34 |
| 2005/0104566 A1 * | 5/2005 | Kim | 323/226 |
| 2005/0105367 A1 * | 5/2005 | Kim et al. | 365/226 |
| 2005/0258807 A1 * | 11/2005 | Yanagi | 322/33 |
| 2008/0067983 A1 | 3/2008 | Okamoto | 322/28 |
| 2008/0106395 A1 * | 5/2008 | Kizawa et al. | 340/449 |
| 2009/0121689 A1 * | 5/2009 | Kikuchi et al. | 322/34 |
| 2009/0206802 A1 * | 8/2009 | Mori et al. | 322/99 |

FOREIGN PATENT DOCUMENTS

| | | |
|---|---|---|
| JP | 09308298 A | 11/1997 |
| JP | 10210679 A | 8/1998 |
| JP | 2002272012 A | 9/2002 |
| JP | 2002325085 A | 11/2002 |
| JP | 2003088191 A | 3/2003 |
| JP | 2004194495 A | 7/2004 |
| JP | 2004204841 A | 7/2004 |
| JP | 2005-269688 A | 9/2005 |
| JP | 2006149131 A | 6/2006 |
| JP | 2007-215277 A | 8/2007 |
| WO | WO-2007021378 A2 | 2/2007 |

* cited by examiner

VEHICLE POWER GENERATING DEVICE AND AN ALTERNATOR CONTROL METHOD

The disclosure of Japanese Patent Application No. 2008-254978 filed on Sep. 30, 2008 including the specification, drawings and abstract is incorporated herein by reference in its entirety.

BACKGROUND OF THE INVENTION

1. Field of the Invention

The invention relates to a vehicle power generating device. More particularly, the invention relates to a device that controls power generation in an alternator having a voltage regulator that keeps generated voltage constant, as well as to a control method of that alternator.

2. Description of the Related Art

Japanese Patent Application Publication No. 2006-149131 (JP-A-2006-149131) describes a vehicle power generating device that controls power generation in an alternator. This device includes a voltage regulator that keeps the generated voltage that is output from the alternator constant, an overheat protection circuit that protects the alternator from overheating, and a voltage control circuit that controls the voltage regulator based on the state of an on-board battery and the like.

In this device, the voltage control circuit outputs a high level control signal when the voltage of the on-board battery is lower than a target voltage, and outputs a low level control signal when that voltage is higher than the target voltage. Also, the overheat protection circuit performs an overheat protection operation in which it reduces the excitation current of the alternator when the temperature of the alternator exceeds an upper limit value of a normal range. More specifically, the overheat protection circuit outputs a PWM (Pulse Width Modulation) signal to limit the excitation current. The output from the voltage control circuit and the output from the overheat protection circuit are both input to an AND circuit, and the output from the AND circuit is input to a switching element of the voltage regulator.

In this vehicle power generating device, when the temperature of the alternator exceeds the upper limit value of the normal range, the excitation current of the alternator is reduced by controlling the switching element of the voltage regulator. Therefore, with this device, the alternator can be protected from overheating by stopping or suppressing power generation when the temperature of the alternator is abnormally high.

Typically, an overheat protection circuit uniformly reduces or stops the excitation current of the alternator by changing the applied voltage that is based on the output from the voltage control circuit to a low value when the temperature of the alternator is abnormally high. However, with the structure described above, power generation of the alternator is uniformly reduced or stopped depending on the control of the alternator itself, regardless of the state of the on-board battery or the on-board electrical load. As a result, the supply of power to the on-board system may be significantly affected, e.g., the battery may go dead unexpectedly to the controller.

SUMMARY OF THE INVENTION

This invention thus provides a vehicle power generating device capable of inhibiting the supply of power to the vehicle system from being affected while protecting an alternator from overheating when the temperature of the alternator is abnormally high.

A first aspect of the invention relates to a vehicle power generating device that includes an alternator which has a voltage regulator that keeps the voltage of generated power constant, and an electronic control unit that controls the voltage regulator. The alternator has an abnormally high temperature determining portion that determines whether the temperature of the alternator is abnormally high, and an abnormal signal outputting portion which, when it has been determined by the abnormally high temperature determining portion that the temperature of the alternator is abnormally high, outputs a signal indicative of the determination that the temperature is abnormally high to the electronic control unit. When the electronic control unit receives the signal indicative of the determination that the temperature is abnormally high, the electronic control unit controls the voltage regulator such that the voltage generated by the alternator is suppressed.

With this structure, when the temperature of the alternator is abnormally high, the electronic control unit that controls the voltage regulator detects this abnormally high temperature and executes power generation suppression control. Therefore, when the temperature of the alternator is abnormally high, the alternator can be prevented from overheating while this abnormally high temperature is reflected in the control of the voltage regulator by the electronic control unit. Accordingly, the invention makes it possible to inhibit the supply of power to the vehicle system from being affected while protecting the alternator from overheating when the temperature of the alternator is abnormally high.

In the vehicle power generating device described above, when the electronic control unit receives the signal indicative of the determination that the temperature is abnormally high, the electronic control unit may control the voltage regulator such that the alternator generates power of the minimum voltage with which an on-board electrical load can be properly operated. According to this structure, when the temperature of the alternator is abnormally high, the alternator generates the minimum amount of power with which the necessary on-board electrical loads can be properly operated. This makes it possible to inhibit the supply of power to the vehicle system from being affected while protecting the alternator from overheating when the temperature of the alternator is abnormally high.

Also, in the vehicle power generating device according to this aspect, the alternator may have an excitation winding that becomes excited when energized, and the alternator may generate power by rotation of the excited excitation winding. Further, when the electronic control unit receives the signal indicative of the determination that the temperature is abnormally high, the electronic control unit may control the voltage regulator such that a maximum value of the excitation current that flows through the excitation winding is reduced. According to this structure, power generation is suppressed by reducing the maximum value of the excitation current that flows through the excitation winding of the alternator when the temperature of the alternator is abnormally high. This makes it possible to inhibit the supply of power to the vehicle system from being affected while protecting the alternator from overheating when the temperature of the alternator is abnormally high.

The vehicle power generating device according to this aspect may also include a communication line, one end of which is connected to the voltage regulator and the other end of which is connected to the electronic control unit. Also, the signal indicative of the determination that the temperature is abnormally high may be output via the communication line, and the electronic control unit may control the voltage regulator via the communication line, as well as receive the signal indicative of the determination that the temperature is abnormally high via the communication line.

In the vehicle power generating device according to this aspect, the electronic control unit may calculate a target value, which is a value for the minimum voltage with which an on-board electrical load can be properly operated, based on information related to a state of the vehicle. Also, when the electronic control unit has received the signal indicative of the determination that the temperature is abnormally high, the electronic control unit may control the voltage regulator such that the voltage value of the power generated by the alternator comes to match the calculated target value.

In the vehicle power generating device according to this aspect, the electronic control unit may periodically calculate the target value.

In the vehicle power generating device according to this aspect, the state of the vehicle may include the operating state of the on-board electrical load or the running state of the vehicle.

In the vehicle power generating device according to this aspect, the on-board electrical load may include a meter or a lamp.

The vehicle power generating device according to this aspect, together with a power storage device that stores the power generated by the alternator, may form a vehicle power generating system. In this vehicle power generating system, the state of the vehicle may include the state of the power storage device.

A second aspect of the invention relates to a control method of a vehicle alternator which is provided with an excitation winding that becomes excited when energized, a voltage regulator that keeps the voltage of generated power constant, and an abnormally high temperature determining portion that determines whether the temperature of the alternator is abnormally high, the vehicle alternator generating power by the rotation of the excited excitation winding. This control method includes controlling the alternator such that the voltage of the generated power is suppressed according to the state of the vehicle, when it is determined that the temperature of the alternator is abnormally high.

In the control method according to this aspect, the state of the vehicle may include the operating state of an on-board electrical load or the running state of the vehicle.

In the control method according to this aspect, the power generated by the alternator may be used to charge a power storage device mounted in the vehicle, and the state of the vehicle may include the state of the power storage device.

In the control method according to this aspect, suppressing the voltage of the generated power may include setting the value of the voltage of the generated power to the minimum voltage value with which an on-board electrical load can be properly operated.

In the control method of this aspect, suppressing the voltage of the generated power may include reducing the maximum value of excitation current that flows through the excitation winding.

The invention makes it possible to inhibit the supply of power to the vehicle system from being affected while protecting the alternator from overheating when the temperature of the alternator is abnormally high.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Example embodiments of the present invention will be described in greater detail below with reference to the accompanying drawings.

Figure 1:
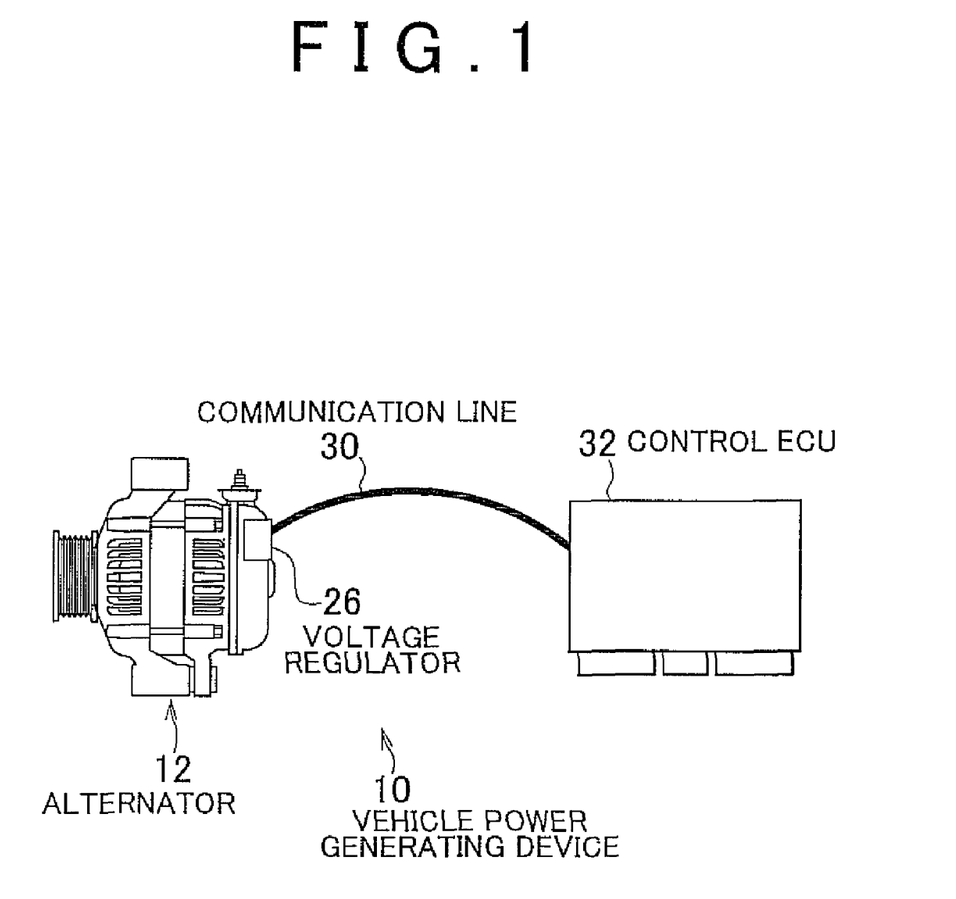
FIG. 1 shows a block diagram of a vehicle power generating device according to an example embodiment of the invention.
Figure 2:
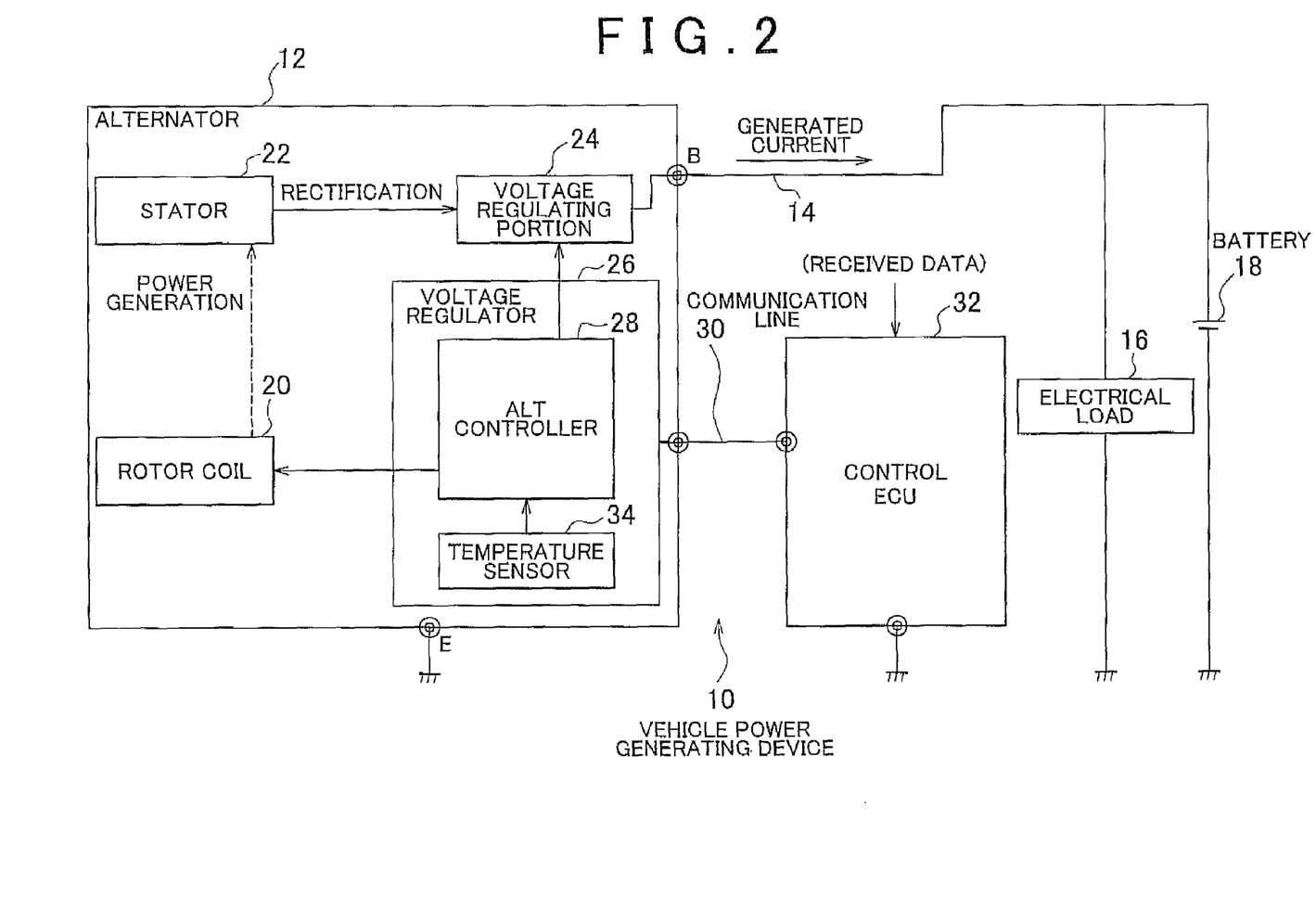
FIG. 2 shows a more detailed block diagram of the vehicle power generating device of the example embodiment.

FIG. 1 shows a block diagram of a vehicle power generating device 10 of an example embodiment of the invention, and FIG. 2 is a more detailed block diagram of the vehicle power generating device 10 of the example embodiment. The vehicle power generating device 10 of this example embodiment is a device which generates power using an alternator 12 as an AC (alternating-current) generator mounted in a vehicle.

As shown in FIG. 1, the vehicle power generating device 10 includes the alternator 12. As shown in FIG. 2, the alternator 12 is connected to various on-board electrical loads 16 and an on-board battery 18 via a power line 14. The on-board electrical loads 16 include meters and lamps and the like. Also, the on-board battery 18 is a DC (direct-current) power supply that outputs voltage of approximately 12 volts, for example. The alternator 12 is driven by the power generated by an on-board engine, and serves to both supply the necessary power to the on-board electrical loads 16 and charge the on-board battery 18, via the power line 14.

The alternator 12 has a rotor coil 20 provided on a rotor, a stator coil 22 provided on a stator, and a rectifier circuit that full-wave rectifies the output of the stator coil 22. The alternator 12 generates power by being driven according to the amount of current flowing through the rotor coil 20. The alternator 12 converts the AC power obtained by generating current to DC power by rectifying it with the rectifier circuit, and then outputs that DC power.

The alternator 12 also has a voltage regulating portion 24 formed of a switching element (such as MOSFET or the like) that is controlled to regulate the generated voltage that is output, and the like, and a voltage regulator 26 provided to keep the generated voltage that is output constant. The voltage regulator 26 has an ALT controller 28 that is mainly formed of a microcomputer. The voltage regulator 26 keeps the generated voltage that is output constant by regulating the excitation current that flows through the rotor coil 20. This is achieved by regulating the voltage that is applied to the rotor coil 20, which is done appropriately switch-driving the voltage regulating portion 24 using the ALT controller 28.

An output terminal of the alternator 12 is connected to the on-board electrical loads 16 and the on-board battery 18 via the power line 14. The generated power that is output from the alternator 12 is supplied to the on-board electrical loads 16 and the on-board battery 18 through the power line 14.

The voltage regulator 26 of the alternator 12 is connected via a communication line 30 to an electronic control unit used for control (hereinafter simply referred to as "control ECU") 32 which is mainly formed of a microcomputer. The ALT controller 28 of the voltage regulator 26 and the control ECU 32 each have a communication module for communicating with each other via the communication line 30. The communication line 30 is a time division multiplex communication line that is capable of supporting two-way communication between the voltage regulator 26 and the control ECU 32. Signals are transmitted between the communication modules based on a predetermined communication protocol.

The control ECU 32 receives data necessary for calculating the voltage to be generated by the alternator 12 from various external sensors. This data includes, for example, the state of the on-board battery 18 (such as the battery voltage, SOC (state-of-charge), and battery temperature), the operating state of the on-board electrical loads 16, and the running state of the vehicle. The control ECU 32 periodically calculates a target voltage to be generated by the alternator 12 based on the received data. The control ECU 32 controls the power generation of the alternator 12 based on the target voltage to be generated by the alternator 12. More specifically, the control ECU 32 creates a communication frame that includes the target voltage data, and outputs this communication frame from the communication module to the communication line 30 so that the target voltage data is supplied to the voltage regulator 26.

Also, the communication module of the voltage regulator 26 of the alternator 12 receives the communication frame sent via the communication line 30 from the control ECU 32, and supplies the target voltage data that is included in the communication frame to the ALT controller 28. The ALT controller 28 then switch-drives the voltage regulating portion 24 to realize the target voltage indicated in the data from the communication module of the control ECU 32.

Also, the voltage regulator 26 has a temperature sensor 34 that is connected to the ALT controller 28. This temperature sensor 34 outputs a signal indicative of the temperature of the alternator 12 to the ALT controller 28. The ALT controller 28 detects the temperature of the alternator 12 based on the signal received from the temperature sensor 34 and compares that temperature with an upper limit value of a preset normal range. If the alternator temperature exceeds this upper limit value, it is determined that the temperature of the alternator 12 is abnormally high and a communication frame is sent from the communication module to the communication line 30 to notify the control ECU 32.

Figure 3:
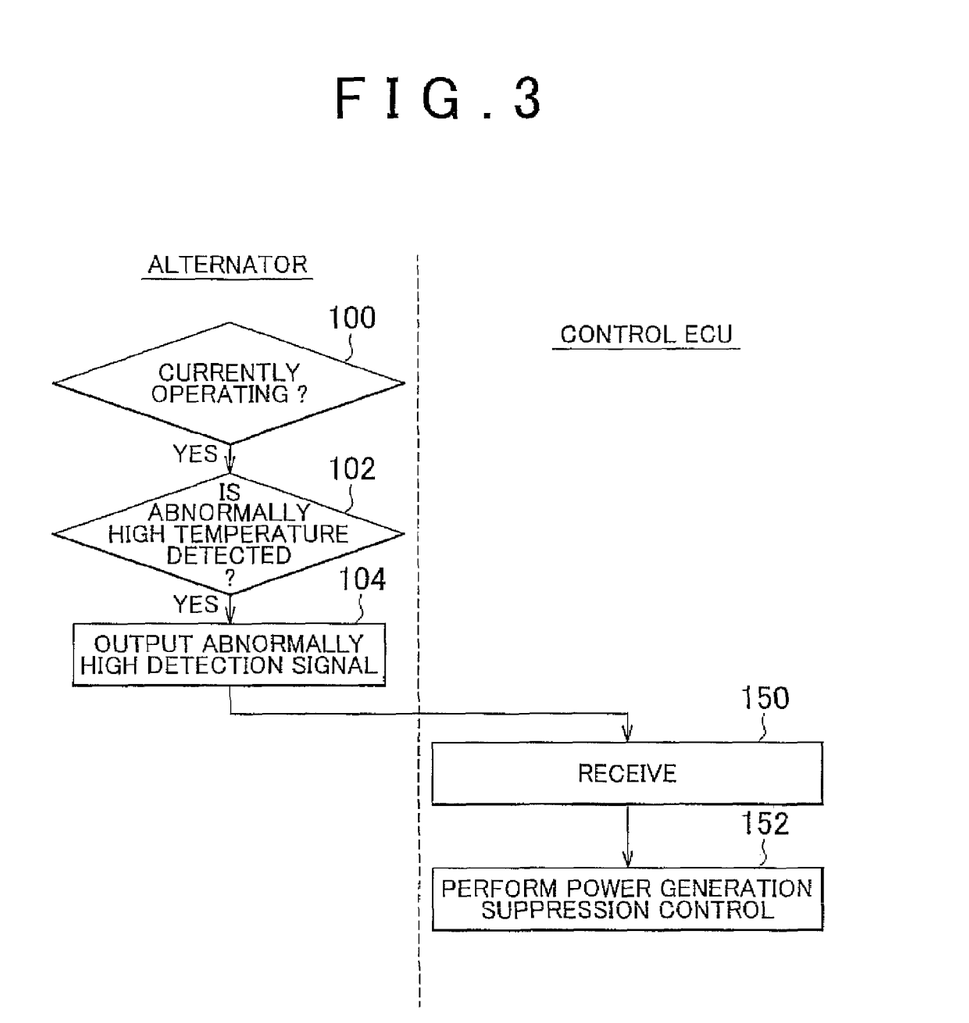
FIG. 3 shows a flowchart illustrating one example of a control routine executed in the vehicle power generating device of the example embodiment.
Figure 4:
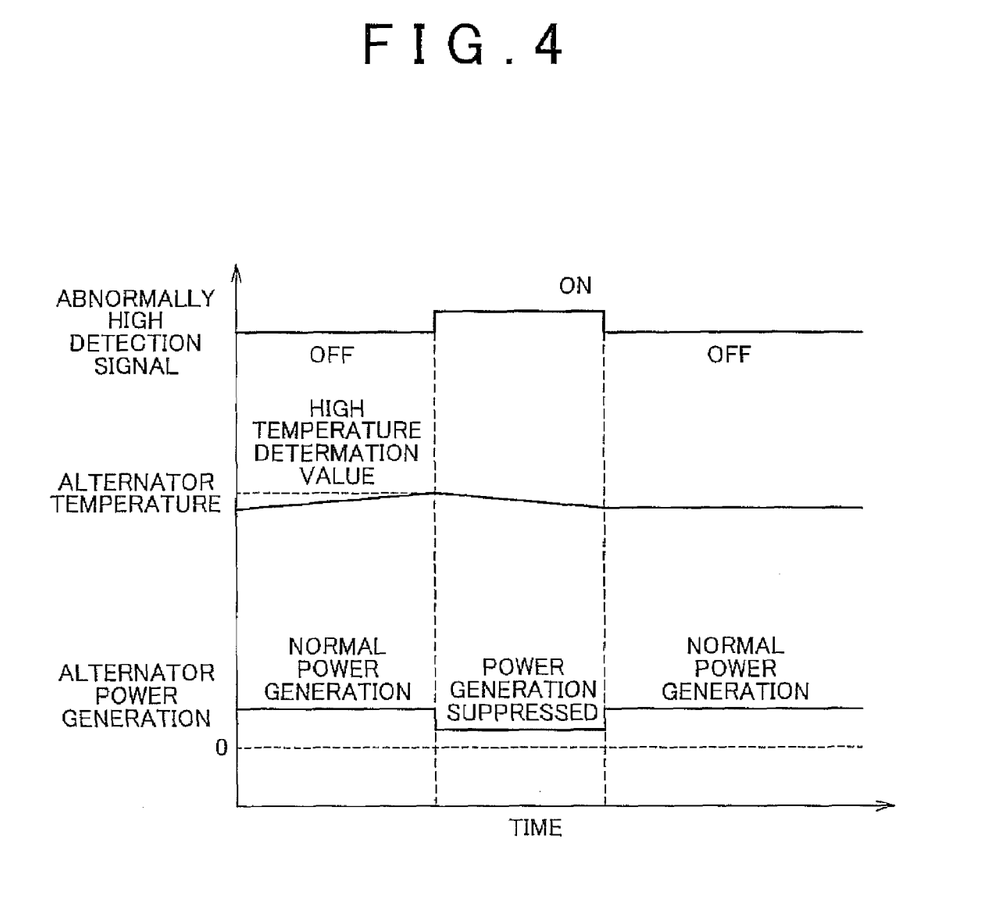
FIG. 4 shows a time chart of the operations of the vehicle power generating device of the example embodiment.

Next, the operation of the vehicle power generating device 10 of this example embodiment will be described with reference to FIGS. 3 and 4. FIG. 3 shows a flowchart illustrating one example of a control routine executed by the control ECU 32 and the ALT controller 28 of the voltage regulator 26 in the vehicle power generating device 10 of this example embodiment. Also, FIG. 4 shows a time chart of the operations of the vehicle power generating device 10 of the example embodiment.

In this example embodiment, the control ECU 32 periodically calculates the voltage to be generated by the alternator 12 based on the received data. Once the target voltage to be generated by the alternator 12 is calculated, the control ECU 32 then creates a communication frame that includes this target voltage data and outputs the communication frame from the communication module to the communication line 30 to supply the target voltage data to the voltage regulator 26.

When the communication module of the ALT controller 28 of the voltage regulator 26 receives the communication frame sent by the control ECU 32 via the communication line 30, the ALT controller 28 switch-drives the voltage regulating portion 24 to realize the target voltage indicated in the data of that communication frame. When the voltage regulating portion 24 is switch-driven, an appropriate amount of current is supplied to the rotor coil 20 so that the alternator 12 generates power to realize the target voltage. In this case, the power is supplied from the alternator 12 to the on-board electrical loads 16, as well as to the on-board battery 18 to charge it, via the power line 14.

Also in this example embodiment, when the alternator 12 is generating power (i.e., when the determination in step 100 is yes), the ALT controller 28 of the voltage regulator 26 determines whether the temperature of the alternator 12 is abnormally high by detecting the temperature of the alternator 12 based on the signal input from the temperature sensor 34 and comparing that detected temperature with the upper limit value of the normal range (step 102). If the alternator temperature is not above the upper limit value, this cycle of the routine promptly ends at this point. If, on the other hand, the alternator temperature is above the upper limit value, an abnormally high temperature is detected, and a communication frame that includes an abnormally high temperature detection signal that indicates that an abnormally high temperature has been detected is output from the communication module to the communication line 30 (step 104).

When controlling the power generation of the alternator 12, the communication module of the control ECU 32 receives the communication frame sent from the voltage regulator 26 via the communication line 30 (step 150), and the control ECU 32 performs control to suppress the generation of power by the alternator 12 so that it is lower than normal (i.e., performs power generation suppression control) (step 152) after confirming that the communication frame includes an abnormally high detection signal.

More specifically, the control ECU 32 calculates a value that is lower than the normal value which is based on the data received from the various external sensors, as the target voltage to be generated by the alternator 12. That is, the control ECU 32 suppresses the maximum value of the excitation current that is allowed to flow through the rotor coil 20 so that it is lower than normal. At this time, for example, the maximum value may be suppressed by a fixed percentage, or the degree to which the maximum value is suppressed may be changed depending on the state of the on-board electrical loads 16 and the like at that time. For example, the maximum value may be suppressed to a degree that makes it possible to ensure that the minimum amount of power with which the necessary on-board electrical loads 16 can operate normally (e.g., all of the operating on-board electrical loads 16 or only those operating on-board electrical loads 16 that are designated in advance as loads to which power needs to be supplied) is generated.

Once the control ECU 32 calculates the value that is lower than the normal value as the target voltage to be generated by the alternator 12 as described above, the control ECU 32 then creates a communication frame that contains the reduced target voltage data, and outputs this communication frame from the communication module to the communication line 30 so that this target voltage data is supplied to the voltage regulator 26.

When the communication module of the ALT controller 28 of the voltage regulator 26 receives the communication frame sent from the control ECU 32 via the communication line 30 after an abnormally high temperature of the alternator 12 is detected, the ALT controller 28 switch-drives the voltage regulating portion 24 to realize the target voltage indicated in the data in the communication frame. In this case, when the voltage regulating portion 24 is switch-driven, less current than normal is supplied to the rotor coil 20 to make the alternator 12 generate power to realize the target voltage that is lower than normal.

In this way, with the vehicle power generating device 10 of this example embodiment, when an abnormally high temperature of the alternator 12 is detected, the alternator 12 outputs an abnormally high detection signal to the control ECU 32 via the communication line 30. Then the control ECU 32 specifies a value that is lower than the normal value as the target voltage to be generated by the alternator 12 based on the received high temperature detection signal, and outputs a signal indicative of that reduced target voltage to the alternator 12 via the communication line 30. In this case, the alternator 12 generates power with the target voltage that is lower than normal.

Suppressing power generation in the alternator 12 when the temperature of the alternator 12 is abnormally high prevents the alternator 12 from overheating while maintaining minimum power generation. As long as minimum power generation by the alternator 12 is maintained, power will not stop being generated, which reduces the chances of the on-board battery 18 dying and the on-board electrical loads 16 malfunctioning.

Also, in this example embodiment, when the temperature of the alternator 12 is abnormally high, the alternator 12 notifies the control ECU 32 via the communication line 30 of that abnormally high temperature, after which the control ECU 32 controls the power generation of the alternator 12 in a manner reflecting that abnormally high temperature (i.e., performs power generation suppression control). With the structure in this example embodiment, the power generation control of the alternator 12 at this time is not performed entirely irrespective of the states of the on-board battery 18 and the on-board electric loads 16 according to control by the alternator 12 itself. Therefore, it possible to avoid a situation in which the on-board battery 18 dies or the on-board electrical loads 16 malfunction, from unexpectedly occurring all of a sudden due to the control ECU 32.

Accordingly, with the vehicle power generating device 10 of this example embodiment, when the temperature of the alternator 12 is abnormally high, minimum power generation is able to be maintained while protecting the alternator 12 from overheating. In addition, adverse effects from the on-board battery 18 dying or the on-board electrical loads 16 malfunctioning on the supply of power to the on-board system are able to be suppressed. Therefore, even if the temperature of the alternator 12 is abnormally high, cooling of the alternator 12 can be promoted to quickly return it to its normal power generating state. In addition, minimum power generation by the alternator 12 is able be maintained so problems such as the on-board battery 18 dying or the on-board electrical loads 16 malfunctioning can be prevented from unexpectedly occurring.

Incidentally, in the example embodiment described above, the control ECU 32 is one example of the electronic control unit of the invention, the ALT controller 28 is one example of the abnormally high temperature determining portion of the invention, the communication module of the alternator 12 is one example of the abnormal signal outputting portion of the invention, and the battery 18 is one example of the power storage device of the invention.

In the example embodiment described above, power generation by the alternator 12 is reduced to the minimum when the alternator temperature detected using the temperature sensor 34 exceeds the upper limit value of the normal range. Thereafter, the alternator temperature is used as a condition to return power generation by the alternator 12 to normal. Hysteresis is provided for both the upper limit value of the normal range, which is the condition for changing power generation by the alternator 12 from normal power generation to minimum power generation, and the threshold value which is the condition for returning power generation by the alternator 12 from minimum power generation to normal power generation.

In this case, when it is detected based on the signal from the temperature sensor 34 that the alternator temperature is equal to or less than that threshold value, the ALT controller 28 of the voltage regulator 26 outputs a communication frame that includes a detection signal indicating that the alternator temperature is no longer abnormally high to the communication line 30 from the communication module. Then when performing power suppression control of the alternator 12, the control ECU 32 receives the communication frame output from the voltage regulator 26 via the communication line 30, and after confirming that this communication frame includes a detection signal indicating that the alternator temperature is no longer abnormally high, the control ECU 32 returns the power generating control of the alternator 12 back to normal.

In the example embodiment described above, the communication of the abnormally high temperature detection signal from the alternator 12 to the control ECU 32 and the communication of the data of the target pressure from the control ECU 32 to the alternator 12 is performed over the single communication line 30. However, the invention is not limited to this. For example, a plurality of communication lines may be provided and each communication may be performed via a separate communication line. The communication lines used in this case may enable only one-way communication or two-way communication.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A vehicle power generating device comprising:
   an alternator which has a voltage regulator that keeps the voltage of generated power constant, the alternator having an excitation winding that becomes excited when energized, the alternator generates power by rotation of the excited winding; and
   an electronic control unit that controls the voltage regulator,
   wherein the alternator has an abnormally high temperature determining portion that determines whether the temperature of the alternator is abnormally high, and an abnormal signal outputting portion which, when it has been determined by the abnormally high temperature determining portion that the temperature of the alternator is abnormally high, outputs a signal indicative of the determination that the temperature is abnormally high to the electronic control unit; and when the electronic control unit receives the signal indicative of the determination that the temperature is abnormally high, the electronic control unit calculates a target voltage to be generated by the alternator based on information relating to a state of the vehicle, the target voltage being a minimum voltage with which an on-board electrical load can be properly operated and the target voltage is lower than a normal voltage which is calculated when an abnormally high temperature is not determined; and
   wherein when the electronic control unit receives the signal indicative of the determination that the temperature is abnormally high, the electronic control unit controls the voltage regulator according to the target voltage such that the alternator generates the minimum voltage with which the on-board electrical load can be properly operated and the electronic control unit controls the voltage regulator to suppress a maximum value of the excitation current that is allowed to flow through the alternator to a value that is lower than a normal maximum value when the abnormally high temperature is not determined.

2. The vehicle power generating device according to claim 1, further comprising:
a communication line, one end of which is connected to the voltage regulator and the other end of which is connected to the electronic control unit,
wherein the signal indicative of the determination that the temperature is abnormally high is output via the communication line; and the electronic control unit controls the voltage regulator via the communication line, as well as receives the signal indicative of the determination that the temperature is abnormally high via the communication line.

3. The vehicle power generating device according to claim 1, wherein the electronic control unit periodically calculates the target voltage.

4. The vehicle power generating device according to claim 1, wherein the state of the vehicle includes the operating state of the on-board electrical load or the running state of the vehicle.

5. The vehicle power generating device according to claim 1, wherein the on-board electrical load includes a meter or a lamp.

6. A vehicle power generating system comprising:
the vehicle power generating device according to claim 1; and
a power storage device that stores the power generated by the alternator,
wherein the state of the vehicle includes the state of the power storage device.

7. A control method of a vehicle alternator which is provided with an excitation winding that becomes excited when energized, a voltage regulator that keeps the voltage of generated power constant, and an abnormally high temperature determining portion that determines whether the temperature of the alternator is abnormally high, the vehicle alternator generating power by the rotation of the excited excitation winding, the control method comprising:
detecting the temperature of the alternator;
determining whether the temperature of the alternator is abnormally high;
calculating a target voltage to be generated by the alternator based on information relating to a state of the vehicle when it is determined that the temperature of the alternator is abnormally high, the target voltage being a minimum voltage with which an on-board electrical load can be properly operated, the target voltage is lower than a normal voltage which is calculated when an abnormally high temperature is not determined;
controlling the alternator according to the target voltage such that the alternator generates the minimum voltage with which an on-board electrical load can be properly operated, when it is determined that the temperature of the alternator is abnormally high; and
suppressing a maximum value of the excitation current that is allowed to flow through the alternator to a value that is lower than a normal maximum value when the abnormally high temperature is not determined.

8. The control method according to claim 7, wherein the state of the vehicle includes the operating state of the on-board electrical load or a running state of the vehicle.

9. The control method according to claim 7, wherein the power generated by the alternator is used to charge a power storage device mounted in the vehicle, and the state of the vehicle includes a state of the power storage device.

* * * * *